(12) United States Patent
Takimoto et al.

(10) Patent No.: US 8,425,124 B2
(45) Date of Patent: Apr. 23, 2013

(54) VEHICLE BEARING DEVICE

(75) Inventors: Masao Takimoto, Kashiwara (JP); Ryoichiro Kotani, Kashiwara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/421,156

(22) Filed: Mar. 15, 2012

(65) Prior Publication Data
US 2012/0243818 A1 Sep. 27, 2012

(30) Foreign Application Priority Data
Mar. 24, 2011 (JP) .................. 2011-065423

(51) Int. Cl.
*F16C 35/12* (2006.01)

(52) U.S. Cl.
USPC ....................................... 384/589

(58) Field of Classification Search .............. 384/589, 384/571
See application file for complete search history.

(56) References Cited

U.S. PATENT DOCUMENTS

| 6,280,093 | B1 | 8/2001 | Ohtsuki et al. |
| 6,616,340 | B2* | 9/2003 | Hacker ............ 384/571 |
| 2009/0129717 | A1* | 5/2009 | Fujimura et al. ........ 384/589 |
| 2009/0189437 | A1* | 7/2009 | Takimoto ............ 384/589 |

FOREIGN PATENT DOCUMENTS

JP    A-2000-211310    8/2000

\* cited by examiner

*Primary Examiner* — Thomas R Hannon
(74) *Attorney, Agent, or Firm* — Oliff & Berridge, PLC

(57) ABSTRACT

In a vehicle bearing device hub spindle, annular first to third grinding undercut portions, each being a recess in sectional view, are formed in the same shape, through turning, at a large-rib-surface-side end portion of an inner raceway surface, a large-diameter-portion-side end portion of the inner raceway surface, and a large-diameter-portion-side end portion of an outer peripheral surface of an intermediate-diameter portion.

2 Claims, 4 Drawing Sheets

VEHICLE BEARING DEVICE

INCORPORATION BY REFERENCE

The disclosure of Japanese Patent Application No. 2011-065423 filed on Mar. 24, 2011 including the specification, drawings and abstract, is incorporated herein by reference in its entirety.

BACKGROUND OF THE INVENTION

1. Field of the Invention

The invention relates to a vehicle bearing device that supports a wheel of an automobile, or the like.

2. Description of Related Art

For example, a bearing device that supports a wheel of an automobile includes a hub spindle 101, an inner ring 102, an outer ring 103 and an annular pulsar ring 105 as shown in FIG. 4 (for example, see Japanese Patent Application Publication No. 2000-211310 (JP 2000-211310 A). The inner ring 102 is fitted to an outer periphery of an end portion of the hub spindle 101. The outer ring 103 is arranged coaxially with the hub spindle 101, on the radially outer side of the hub spindle 101 and the inner ring 102 via rollers arranged in two rows, that is, via first tapered rollers 104a and second tapered rollers 104b. The pulsar ring 105 is fitted to the outer periphery of the hub spindle 101. A sensor (not shown), which detects the rotation of the pulsar ring 105 that rotates together with the hub spindle 101, is fixed to the outer ring 103. The rotation speed of the wheel, used to control an anti-lock brake system, or the like, is obtained based on the detected result of the sensor.

The hub spindle 101 has a flange 111, a large rib surface 112, an inner raceway surface 113, a large-diameter portion 114, an intermediate-diameter portion 115 and a small-diameter portion 116 that are arranged in this order from one axial end portion of the outer periphery toward the other axial end portion of the outer periphery. The wheel (not shown) is fitted to the flange 111. A large-diameter-side end face of each of the first tapered rollers 104a is in sliding-contact with the large rib surface 112. The first tapered rollers 104a roll on the inner raceway surface 113. The outside diameter of the intermediate-diameter portion 115 is smaller than the outside diameter of the large-diameter portion 114. The outside diameter of the small-diameter portion 116 is smaller than the outside diameter of the intermediate-diameter portion 115. The pulsar ring 105 is fitted to the outer periphery of the intermediate-diameter portion 115, and the inner ring 102 is fitted to the outer periphery of the small-diameter portion 116.

An annular first grinding undercut portion 119a, which is a recess in a sectional view, is formed, through turning, at the end portion, on the large rib surface 112-side, of the inner raceway surface 113 of the hub spindle 101 of such a vehicle bearing device. Due to the first grinding undercut portion 119a, the end portion, on the large rib surface 112-side, of the inner raceway surface 113 does not contact the corner, on the large-diameter end side, of each first tapered roller 104a. In addition, an annular second grinding undercut portion 119b, which is a recess in a sectional view, is formed, through turning, at the end portion, on the large-diameter portion 114-side, of the inner raceway surface 113. Due to the annular second grinding undercut portion 119b, a play is provided for each first tapered roller 104a in the axial direction. Furthermore, an annular third grinding undercut portion 119c, which is a recess in sectional view, is formed, through turning, at the end portion, on the large-diameter portion 114-side, of the outer peripheral surface of the intermediate-diameter portion 115. Due to the annular third grinding undercut portion 119c, a grinding stone, or the like, does not interfere with a step surface 118 when grinding is performed on the outer peripheral surface of the intermediate-diameter portion 115.

In the existing vehicle bearing device, the first to third grinding undercut portions 119a to 119c formed on the outer periphery of the hub spindle 101 are formed into different shapes as shown in FIG. 4. Therefore, when the first to third grinding undercut portions 119a to 119c are formed through turning, turning tools, such as a tool and a tip, need to be changed based on the shapes of the grinding undercut portions 119a to 119c or the positioned angle of a turning tool relative to the hub spindle 101 needs to be changed. Therefore, there is a problem that the turning process for the grinding undercut portions 119a to 119c is complex, which reduces the efficiency of manufacturing the hub spindle 101.

SUMMARY OF THE INVENTION

The invention provides a vehicle bearing device in which a plurality of grinding undercut portions is easily formed in a hub spindle through turning.

An aspect of the invention relates to a vehicle bearing device including a hub spindle, an inner ring, an outer ring, a plurality of tapered rollers, an annular pulsar ring, and a sensor. The hub spindle has a flange to which a wheel is fitted, a large rib portion, an inner raceway surface, a large-diameter portion, an intermediate-diameter portion that is smaller in outside diameter than the large-diameter portion, and a small-diameter portion that is smaller in outside diameter than the intermediate-diameter portion, which are arranged in this, order from one axial end portion of an outer periphery of the hub spindle toward the other axial end portion of the outer periphery. The inner ring has an inner ring raceway surface on its outer periphery, and is fitted to an outer periphery of the small-diameter portion of the hub spindle. The outer ring has two outer ring raceway surfaces on its inner periphery, and is fixed to a vehicle body side-member so as to be coaxial with the hub spindle, on a radially outer side of the hub spindle and the inner ring. The tapered rollers are rollably arranged between the two outer ring raceway surfaces, and the inner raceway surface and the inner ring raceway surface. The annular pulsar ring is fitted to an outer periphery of the intermediate-diameter portion of the hub spindle, and rotates together with the hub spindle. The sensor is fitted to the outer ring, and is used to detect rotation of the pulsar ring. The large rib portion of the hub spindle has a large rib surface with which large-diameter-side end faces of the tapered rollers are in sliding contact. An annular grinding undercut portion, which is a recess in sectional view, is formed, through turning, at each of at least two of a large rib surface-side end portion of the inner raceway surface, a large-diameter portion-side end portion of the inner raceway surface, and a large-diameter portion side end portion of the outer periphery of the intermediate-diameter portion. The grinding undercut portions are formed in the same shape.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENTS

Figure 1:
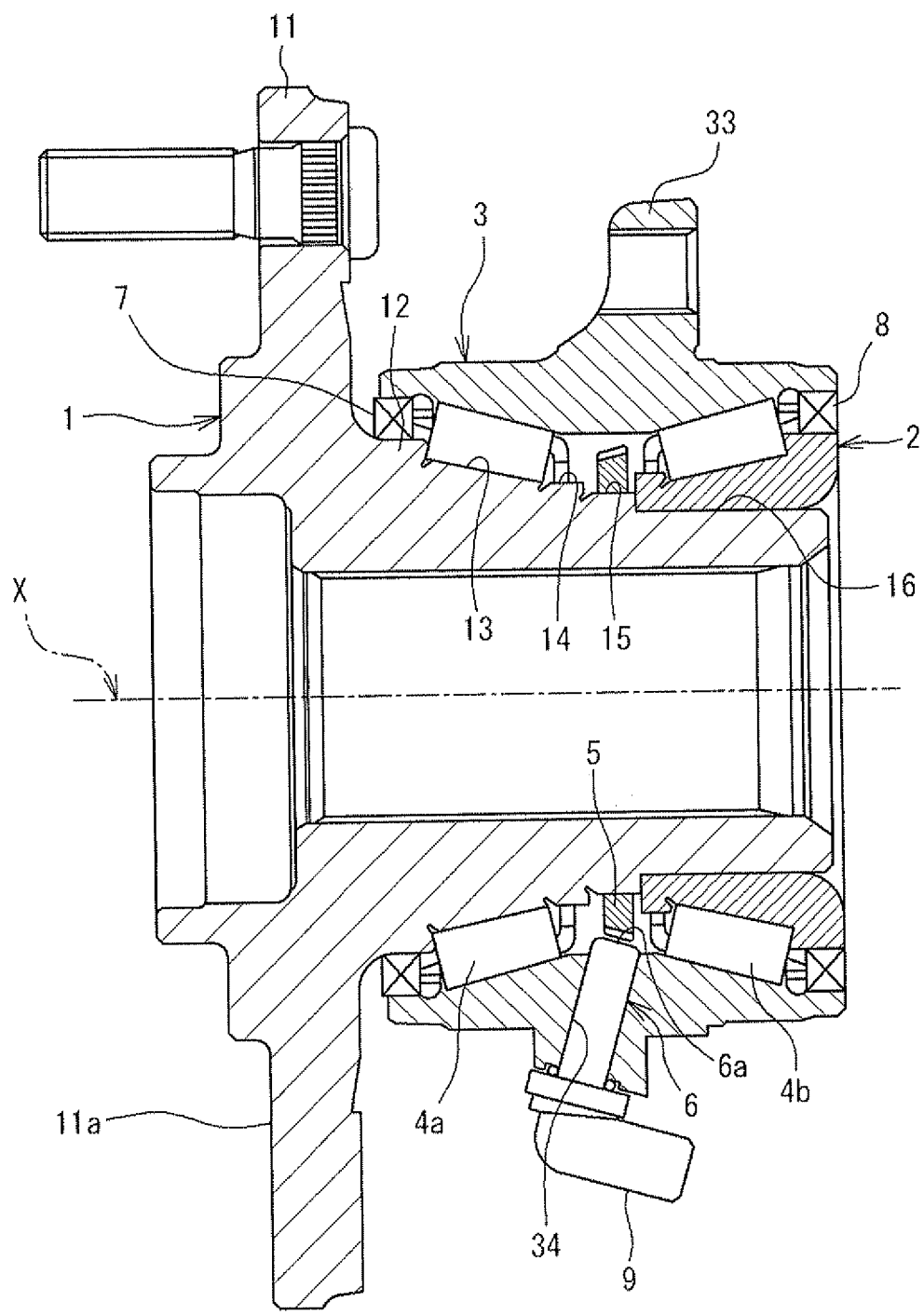
FIG. 1 is a longitudinal sectional view that shows a vehicle bearing device according to an embodiment of the invention.
Figure 2:
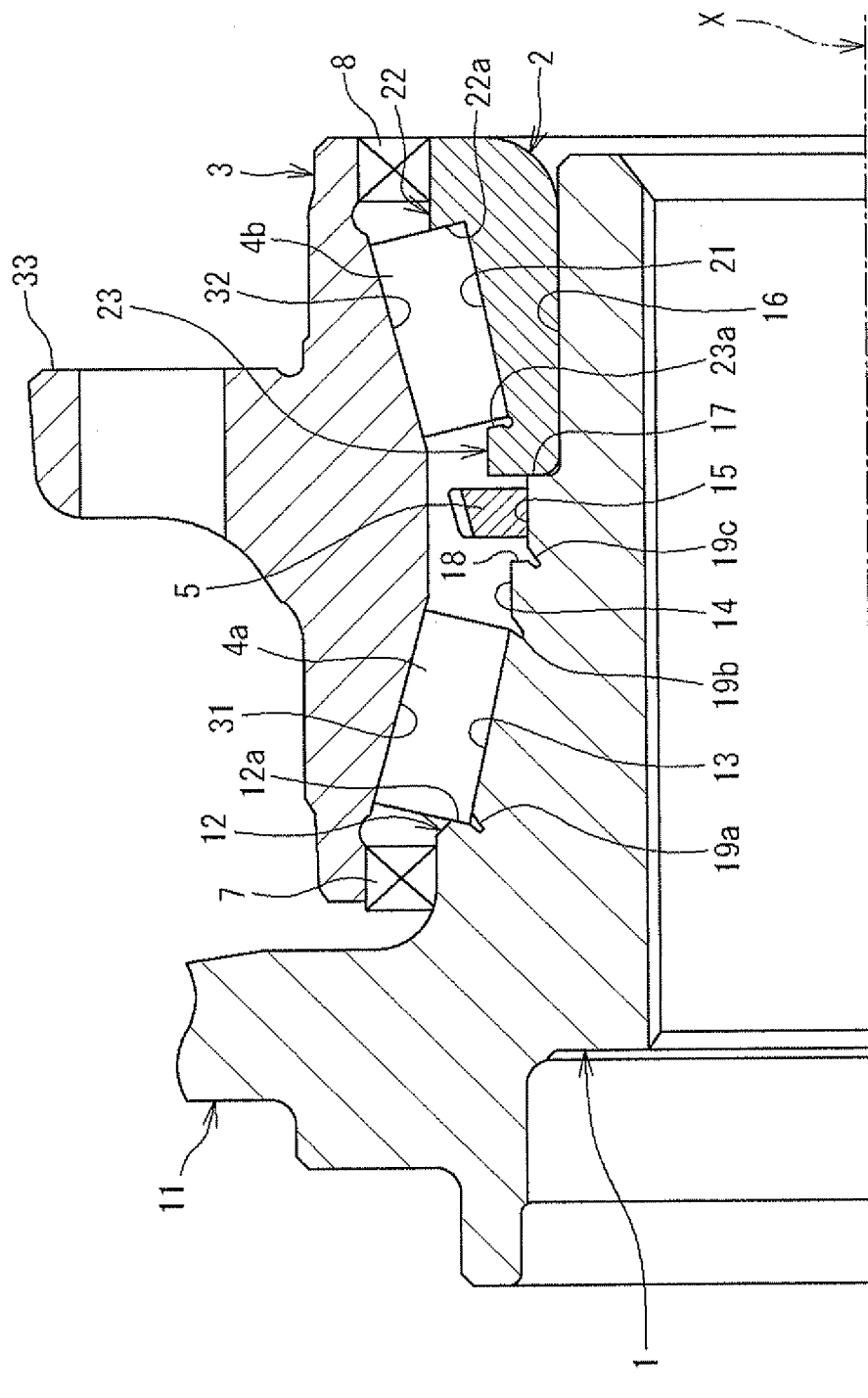
FIG. 2 is an enlarged longitudinal sectional view of main portions in FIG. 1.

Hereinafter, an embodiment of the invention will be described in detail with reference to the accompanying drawings. FIG. 1 is a longitudinal sectional view of a vehicle bearing device according to the embodiment of the invention. FIG. 2 is an enlarged longitudinal sectional view of main portions in FIG. 1. In FIG. 1, the vehicle bearing device is used to support a wheel of a vehicle, such as an automobile, and includes a hub spindle 1, an inner ring 2, an outer ring 3, an annular pulsar ring 5 and a sensor 6. The inner ring 2 is fitted to an outer periphery of the hub spindle 1. The outer ring 3 is arranged coaxially with the hub spindle 1, on the radially outer side of the hub spindle 1 and the inner ring 2 via tapered rollers arranged in two rows, that is, first tapered rollers 4a and second tapered rollers 4b. The pulsar ring 5 rotates together with the hub spindle 1. The sensor 6 is fitted to the outer ring 3 so as to detect the rotation of the pulsar ring 5.

The hub spindle 1 has a flange 11, a large rib portion 12, an inner raceway surface 13, a large-diameter portion 14, an intermediate-diameter portion 15 and a small-diameter portion 16 in this order from one axial end portion (left side in FIG. 1) of the outer periphery of the hub spindle 1 toward the other axial end portion (right side in FIG. 1) of the outer periphery. A wheel (not shown) is fitted to the flange 11. The outside diameter of the intermediate-diameter portion 15 is smaller than the outside diameter of the large-diameter portion 14. The outside diameter of the small-diameter portion 16 is smaller than the outside diameter of the intermediate-diameter portion 15. The flange 11 is formed to extend radially outward, at the one axial end portion of the hub spindle 1, and has a wheel fitting surface 11a that is perpendicular to the axis X of the hub spindle 1.

In FIG. 2, the inner ring 2 is a rotary ring that is fitted to the outer periphery of the small-diameter portion 16 of the hub spindle 1, and a single inner ring raceway surface 21 on which the second tapered rollers 4b roll is formed on the outer periphery of the inner ring 2. The inner ring 2 has a large rib portion 22 and a small rib portion 23. The large rib portion 22 has a large rib surface 22a with which the large-diameter-side end face of each second tapered roller 4b is in sliding contact. The small rib portion 23 has a small rib surface 23a with which the small-diameter-side end face of each second tapered roller 4b is in sliding contact. The end face, on the small rib portion 23-side, of the inner ring 2 is in contact with a step surface 17 that connects the intermediate-diameter portion 15 and the small-diameter portion 16 of the hub spindle 1 to each other. A seal member 8 that hermetically seals the inside of the bearing is provided between the outer peripheral surface of the large rib portion 22 of the inner ring 2 and the inner peripheral surface of the outer ring 3, facing the outer peripheral surface of the large rib portion 22.

The outer ring 3 is a fixed ring that is fixed to the vehicle-side member, and two outer ring raceway surfaces, that is, a first outer ring raceway surface 31 and a second outer ring raceway surface 32 on which the first tapered rollers 4a and the second tapered rollers 4b respectively roll are formed on the inner periphery of the outer ring 3. A fitting flange 33 for fitting the vehicle bearing device to a suspension (not shown) of the vehicle is formed on the outer periphery of the outer ring 3. A seal member 7 that hermetically seals the inside of the bearing is provided between the end portion, on the first outer ring raceway surface 31-side, of the inner periphery of the outer ring 3 and the outer peripheral surface of the large rib portion 12 of the hub spindle 1. The large rib portion 12 of the hub spindle 1 has a large rib surface 12a that extends obliquely and radially outward from the end portion of the inner raceway surface 13. The large-diameter-side end face of each first tapered roller 4a is in sliding-contact with the large rib surface 12a.

The pulsar ring 5 is fitted to the outer periphery of the intermediate-diameter portion 15 of the hub spindle 1, at a position between the first tapered rollers 4a and the second tapered rollers 4b. The outer peripheral surface of the intermediate-diameter portion 15 is ground by a grinding stone, or the like, in order to increase the precision at which the pulsar ring 5 is fitted to the intermediate-diameter portion 15. Recesses and projections (not shown) are alternately arranged in the circumferential direction on the outer peripheral portion of the pulsar ring 5, and the outer peripheral portion is to be sensed by the sensor 6.

In FIG. 1, the sensor 6 is fixedly inserted in a fit hole 34 formed in the outer ring 3. Specifically, the sensor 6 has a detecting portion 6a at its distal end, and is fixed to the fit hole 34 with the detecting portion 6a exposed on the radially inner side of the outer ring 3 and placed to face the pulsar ring 5 with a gap. The sensor 6 is, for example, an eddy current displacement sensor. As the pulsar ring 5 rotates together with the hub spindle 1, the sensor 6 detects a change in gap between the detection portion 6a and the pulsar ring 5, which is caused due to the recesses and projections. The detected result (detection signal) is output to a control unit (not shown), such as an ECU of the vehicle, via a harness 9, and the rotation speed and rotation number of times of the hub spindle 1, that is, the rotation speed of the wheel, are obtained by the control unit and is reflected in control of an anti-lock brake system, or the like, of the vehicle.

In FIG. 2, an annular first grinding undercut portion 19a, which is a recess in sectional view, is formed, through turning, at the end portion, on the large rib surface 12a-side, of the inner raceway surface 13 of the hub spindle 1. Due to the first grinding undercut portion 19a, the end portion, on the large rib surface 12a-side, of the inner raceway surface 13 does not interfere with the corner, on the large-diameter end side, of each first tapered roller 4a. In addition, an annular second grinding undercut portion 19b, which is a recess in sectional view, is formed, through turning, at the end portion, on the large-diameter portion 14-side, of the inner raceway surface 13. Due to the second grinding undercut portion 19a, a play is provided for each first tapered roller 4a in the axial direction. Furthermore, an annular third grinding undercut portion 19c, which is a recess in sectional view, is formed, through turning, at the end portion, on the large-diameter portion 14-side, of the outer peripheral surface of the intermediate-diameter portion 15 of the hub spindle 1. Due to the third grinding undercut portion 19c, when the outer peripheral surface of the intermediate-diameter portion 15 is ground as described above, it is possible to prevent interference of a grinding tool, such as a grinding stone, with a step surface 18 that connects the large-diameter portion 14 to the intermediate-diameter portion 15.

Figure 3:
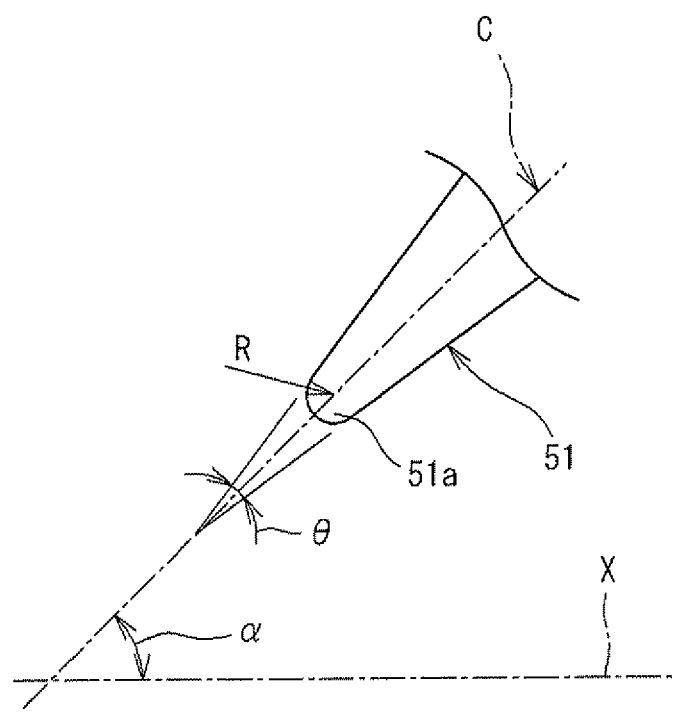
FIG. 3 is an enlarged side view that shows the distal end shape of a turning tool.
Figure 4:
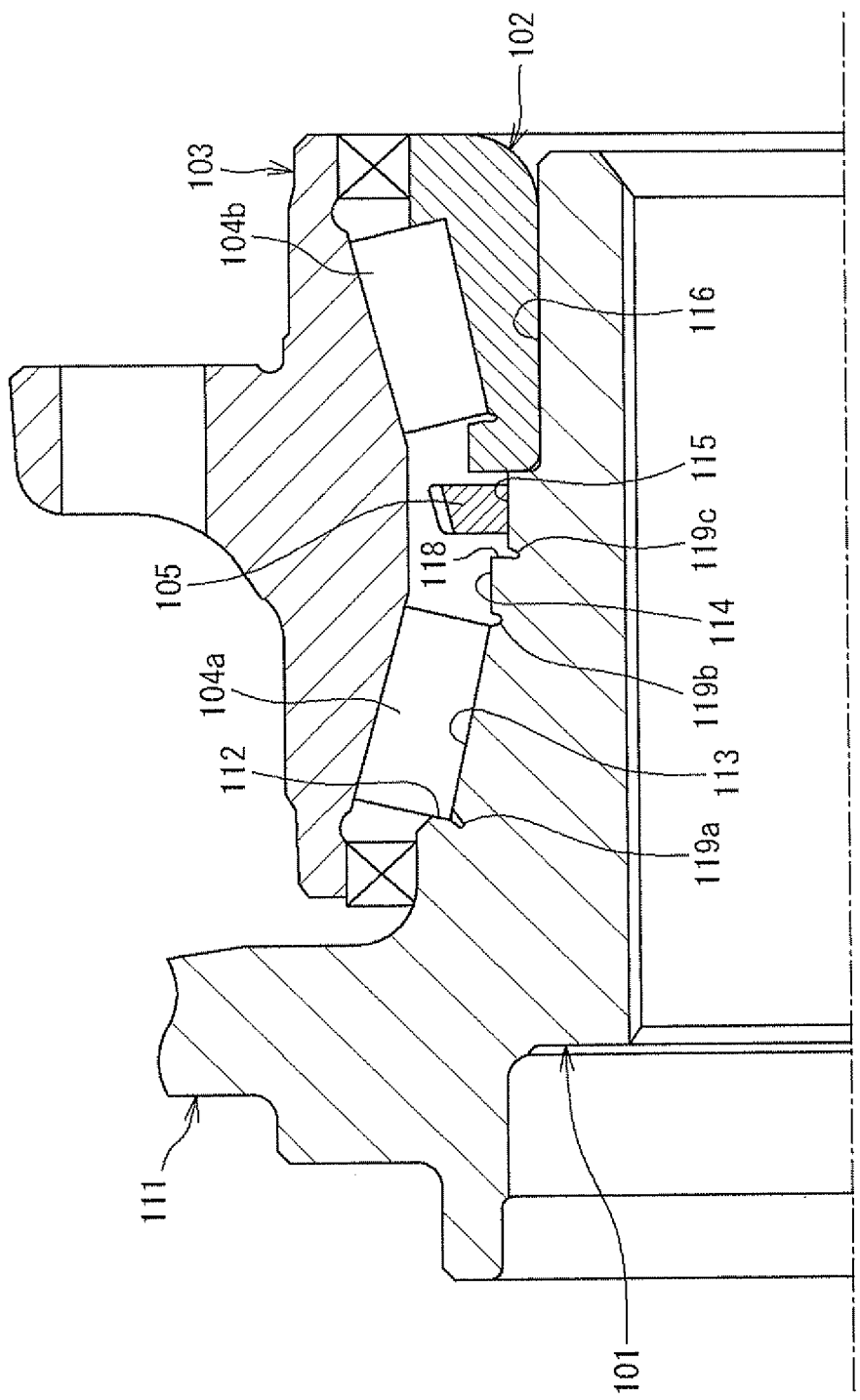
FIG. 4 is a longitudinal sectional view that shows an existing vehicle bearing device.

The first to third grinding undercut portions 19a to 19c are formed through turning with a single turning tool 51, for example, a tool or a tip, such that the first to third grinding undercut portions 19a to 19c have the same shape. FIG. 3 is an enlarged side view that shows the distal end shape of the turning tool 51. The turning tool 51 has a tapered shape that gradually narrows toward the distal end, and has a distal end portion 51a that is formed in a semi-circular shape in side view. In addition, the turning tool 51 turns the hub spindle 1 to form the grinding undercut portions 19a to 19c with its axis C inclined at a predetermined angle with respect to the axis X of the hub spindle 1. Thus, the shape of each of the first to third grinding undercut portions 19a to 19c is determined by the taper angle θ of the turning tool 51, the radius R of the distal end portion 51a and the positioned angle α.

In the present embodiment, the taper angle θ, the radius R and the positioned angle α are set such that the first grinding undercut portion 19a has an optimal shape. Specifically, the taper angle θ is set so as to fall within the range of 30 to 40 degrees, the radius R is set to 0.8 mm and the positioned angle α is set to 27 degrees. Note that the value to which the radius R is set varies depending on the size of the bearing in which the first grinding undercut portion 19a is formed. For example, the radius R is set to 0.6 mm in the case of a small bearing, and the radius R is set to 1.0 mm in the case of a large bearing.

The second and third grinding undercut portions 19b and 19c are formed through turning with the turning tool 51 that is used to form the first grinding undercut portion 19a. Thus, the shape of each of the second and third grinding undercut portions 19b and 19c is formed in the same shape as that of the first grinding undercut portion 19a. Here, the grinding undercut portions having the "same shape" means grinding undercut portions having the same taper angle θ, radius R and positioned angle α. Even if the depths of the second and third grinding undercut portions 19b and 19c, having the same taper angle θ, radius R and positioned angle α as the first grinding undercut portion 19a, are different from the depth of the first grinding undercut portion 19a, the second and third grinding undercut portions 19b and 19c are regarded as having the same shape as the first grinding undercut portion 19a.

In the vehicle bearing device according to the embodiment of the invention, the first to third grinding undercut portions 19a to 19c, formed through turning on the outer periphery of the hub spindle 1a, are formed in the same shape. Therefore, it is not necessary to prepare multiple turning tools 51 and change turning tools 51, or change the positioned angle α of the turning tool 51 with respect to the hub spindle 1, when the grinding undercut portions 19a to 19c are formed through turning. Thus, the first to third grinding undercut portions 19a to 19c are easily formed through turning, so it is possible to increase the efficiency of manufacturing the hub spindle 1.

In addition, each of the second and third grinding undercut portions 19b and 19c is formed in the same shape as the first grinding undercut portion 19a formed at the end portion, on the large rib surface 12a-side, of the inner raceway surface 13. Thus, due to the first grinding undercut portion 19a, it is possible to increase the efficiency of manufacturing the hub spindle 1 while effectively preventing interference of the end portion of each first tapered roller 4a with the end portion, on the large rib surface 12a-side, of the inner raceway surface 13.

Note that the invention is not limited to the above described embodiment, but it may be implemented in various other embodiments. For example, in the present embodiment, the grinding undercut portions other than the first grinding undercut portion are formed in the same shape as the first grinding undercut portion. Alternatively, the grinding undercut portions other than the second grinding undercut portion may be formed in the same shape as the second grinding undercut portion, or the grinding undercut portions other than the third grinding undercut portion may be formed in the same shape as the third grinding undercut portion. In addition, in the present embodiment, the three grinding undercut portions are formed on the outer periphery of the hub spindle. The number of the grinding undercut portions is not particularly limited as long as at least two of these three grinding undercut portions are formed.

In the vehicle bearing device according to the invention, a plurality of grinding undercut portions is easily formed through turning. Therefore, it is possible to increase the efficiency of manufacturing the hub spindle.

What is claimed is:

1. A vehicle bearing device comprising:
   a hub spindle that has a flange to which a wheel is fitted, a large rib portion, an inner raceway surface, a large-diameter portion, an intermediate-diameter portion that is smaller in outside diameter than the large-diameter portion, and a small-diameter portion that is smaller in outside diameter than the intermediate-diameter portion, which are arranged in this order from one axial end portion of an outer periphery of the hub spindle toward the other axial end portion of the outer periphery;
   an inner ring that has an inner ring raceway surface on its outer periphery, and that is fitted to an outer periphery of the small-diameter portion of the hub spindle;
   an outer ring that has two outer ring raceway surfaces on its inner periphery, and that is fixed to a vehicle body side-member so as to be coaxial with the hub spindle, on a radially outer side of the hub spindle and the inner ring;
   a plurality of tapered rollers rollably arranged between the two outer ring raceway surfaces and the inner raceway surface and inner ring raceway surface;
   an annular pulsar ring that is fitted to an outer periphery of the intermediate-diameter portion of the hub spindle, and that rotates together with the hub spindle; and
   a sensor that is fitted to the outer ring, and that is used to detect rotation of the pulsar ring, wherein
   the large rib portion of the hub spindle has a large rib surface with which large-diameter-side end faces of the tapered rollers are in sliding contact,
   an annular grinding undercut portion, which is a recess in sectional view, is formed, through turning, at each of at least two of a large rib surface-side end portion of the inner raceway surface, a large-diameter portion-side end portion of the inner raceway surface, and a large-diameter portion side end portion of the outer periphery of the intermediate-diameter portion, and
   the grinding undercut portions are formed in the same shape.

2. The vehicle bearing device according to claim 1, wherein one of the at least two grinding undercut portions is formed, through turning, at the large rib surface-side end portion of the inner raceway surface, and the remaining grinding undercut portion is formed in the same shape as the one of the at least two grinding undercut portions.

* * * * *